United States Patent [19]
Lee

[11] Patent Number: 5,809,159
[45] Date of Patent: Sep. 15, 1998

[54] STRUCTURE OF AN EARPIECE CLAMP

[76] Inventor: Chun-Sheng Lee, 3F, No. 31, Alley 452, Da-Yeh Rd., Bei-Tou Area, Taipei, Taiwan

[21] Appl. No.: 964,201
[22] Filed: Nov. 4, 1997
[51] Int. Cl.⁶ .................................................... H04R 25/00
[52] U.S. Cl. ................................ 381/380; 381/174; 63/12
[58] Field of Search .................................... 63/12, 13, 11, 63/20, 14.1, 14.4; 381/2, 183, 68, 686, 187, 69; 181/128, 129, 130, 135, 137

[56] References Cited

U.S. PATENT DOCUMENTS

| | | | |
|---|---|---|---|
| 2,841,853 | 7/1958 | Guyot | 63/14.1 |
| 5,170,644 | 12/1992 | Calabro | 63/14.4 |
| 5,379,611 | 1/1995 | Impagliazzo | 63/14.4 |

FOREIGN PATENT DOCUMENTS

| | | | |
|---|---|---|---|
| 0673365 | 2/1990 | Switzerland | 381/68.6 |

*Primary Examiner*—Huyen Le
*Attorney, Agent, or Firm*—Bacon & Thomas

[57] ABSTRACT

A structure of earpiece clamp comprising a connecting seat and a clamp, the connecting seat has a front engaging groove and a rear engaging groove; the clamp inclues an insertion engaging sheet and a pressing sheet, the former has on the bottom thereof a pivot seat, the latter has at the middle thereof a spring leaf which has an extension leaf at either side thereof, the two extension leaves are provided on the bottom thereof with pivot ends pivotally connected with the pivot seat; the front engaging groove of the connecting seat is used for inserting therein an earpiece, while the rear engaging groove is used for inserting therein the insertion engaging sheet from below. The clamp can be clamped on a lower ear lobe, thus the earpiece inserted in the connecting seat can be positioned and fixed properly in an ear of a user.

1 Claim, 4 Drawing Sheets

STRUCTURE OF AN EARPIECE CLAMP

BACKGROUND OF THE INVENTION

1. Field of the Invention

The present invention is related to the structure of an earpiece clamp, and especially to a structure assembled with an earpiece and provided with a clamp, when it is inserted in and clamped on an ear of a user, it provides functions of positioning and fixing and can get rid of the possibility of dropping if the user shakes or waves his head.

2. Description of the Prior Art

A conventional earpiece of the earplug type has the structure of earpiece 1 generally as is shown in FIG. 1, and is comprised of a micro-speaker of the shape of a round disk and a lower housing. The shape of the earplug type earpiece 1 is fixed, however, the shapes of the people using it are various, therefore, the earpiece 1 does not certainly suit every person, and a feeling of inadquate tightness can be sensed by a user wearing it on, when the user shakes or waves his head, it drops. Earpieces 1 of the earplug type are quite widely used nowadays, and partly used on mobile phones, there is no such structure for positioning and fixing of them, and they may drop due to shaking or waving of the heads of the users wearing it (e.g., when in riding a motorcycle), this is surely inconvenient. So that:

SUMMARY OF THE INVENTION

The primary object of the present invention is to provide a structure for fixing an earpiece of the earplug type, which structure can make the earpiece uneasy of dropping when in shaking or waving of the head of a user.

The secondary object of the present invention is to provide a structure which can provide convenience of use, and provide functions of fixing and positioning of the earpiece, hence the earpiece can be properly worn without easiness of moving, and therefore good quality of signal receiving can be obtained.

The present invention will be apparent in its objects stated above and characteristics and functions after reading the detailed description of the preferred embodiment thereof in reference to the accompanying drawings.

DETAILED DESCRIPTION OF THE PREFERRED EMBODIMENT

Figure 1:
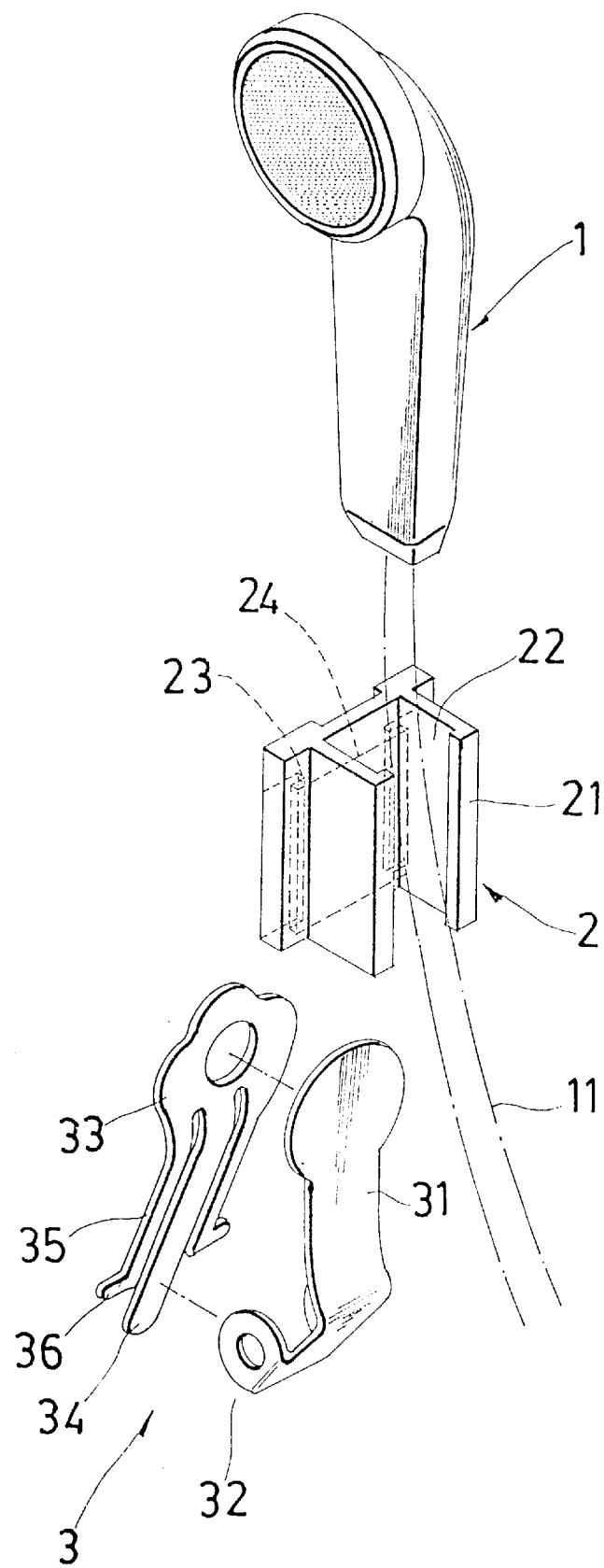
FIG. 1 is an analytic perspective view showing the structure of the present invention used with an earpiece.
Figure 2:
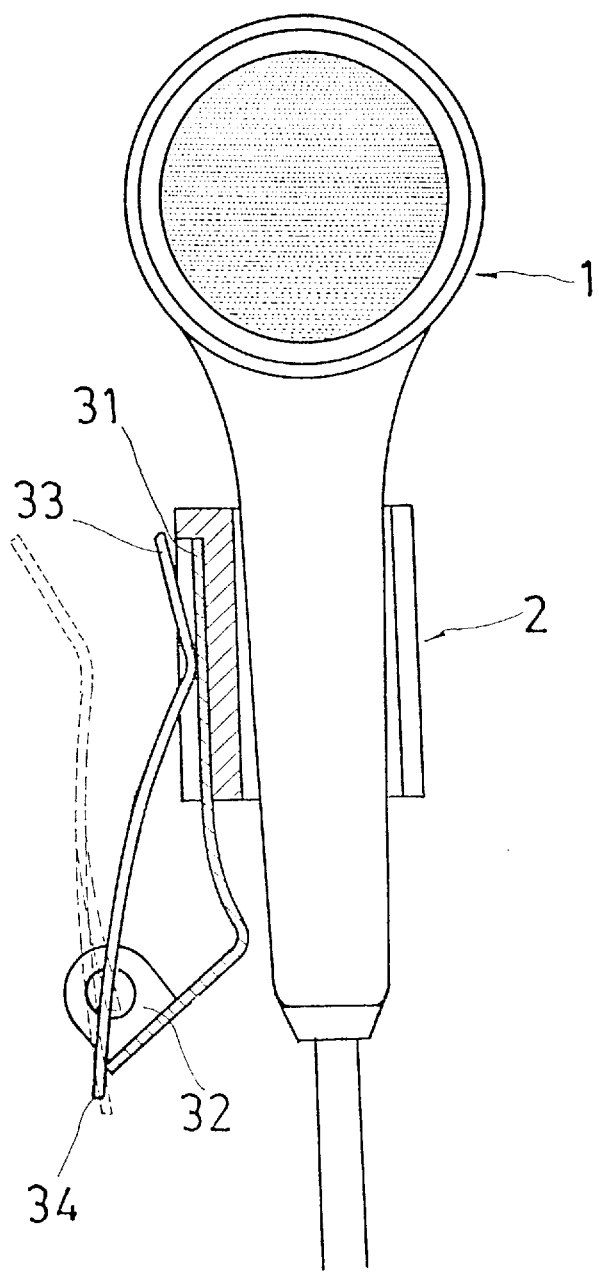
FIG. 2 shows a rear and front perspective views respectively depicting the clamp of the present invention.

Referring to FIG. 1 and 2 of the drawings which are respecively an analytic perspective view of the structure of the present invention used with an earpiece and views of a clamp of the present invention. Wherein, FIG. 1 shows a connecting seat 2 and a clamp 3 of the present invention used with a common earpiece 1; the connecting seat 2 is provided with a front engaging groove 22 defined by two front groove walls 21 thereon, and a rear engaging groove 24 defined by two rear groove walls 23 thereon. FIG. 2 shows a rear and front perspective views respectively depicting the clamp 3 of the present invention, the clamp 3 is comprised of an insertion engaging sheet 31 and a pressing sheet 33, the insertion engaging sheet 31 is provided on the bottom thereof with a pivot seat 32, the pressing sheet 33 is provided at the middle thereof with a spring leaf 34, an extension leaf 35 is provided at either side of the spring leaf 34, the two extension leaves 35 are provided on the bottom thereof with pivot ends 36 extending outwardly, the pivot ends 36 on both sides of the extension leaves 35 are pivotally connected with the pivot seat 32 on the bottom of the insertion engaging sheet 31.

By the above stated structure, the front engaging groove 22 of the connecting seat 2 is used for inserting therein the earpiece 1, while the rear engaging groove 24 of the connecting seat 2 is used for inserting therein the insertion engaging sheet 31 from below.

Figure 3:
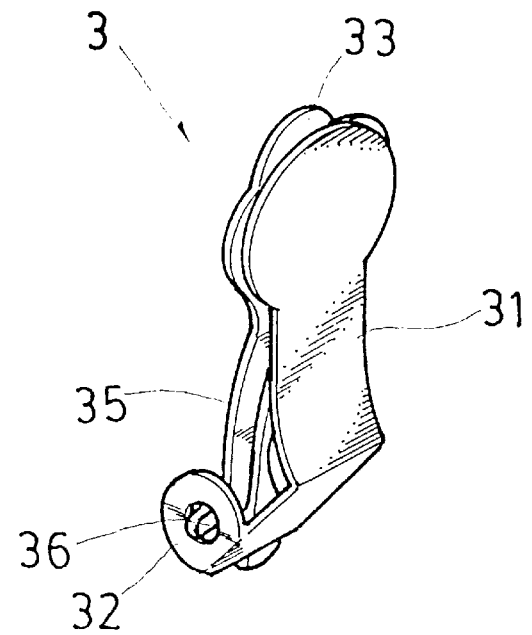
FIG. 3 is a schematic view showing action of the present invention.
Figure 3:
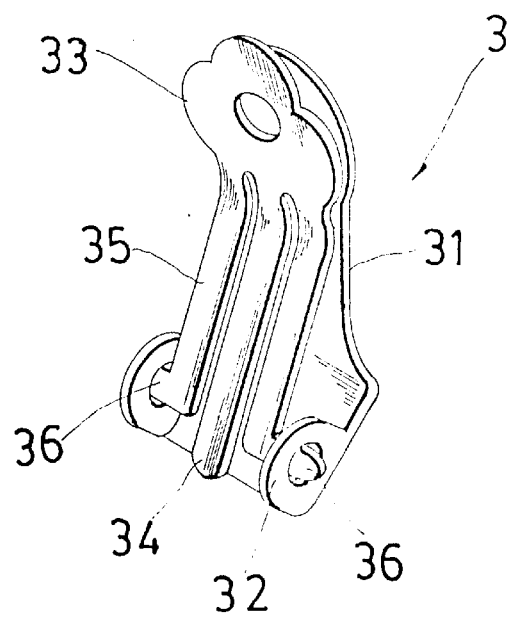
Figure 4:
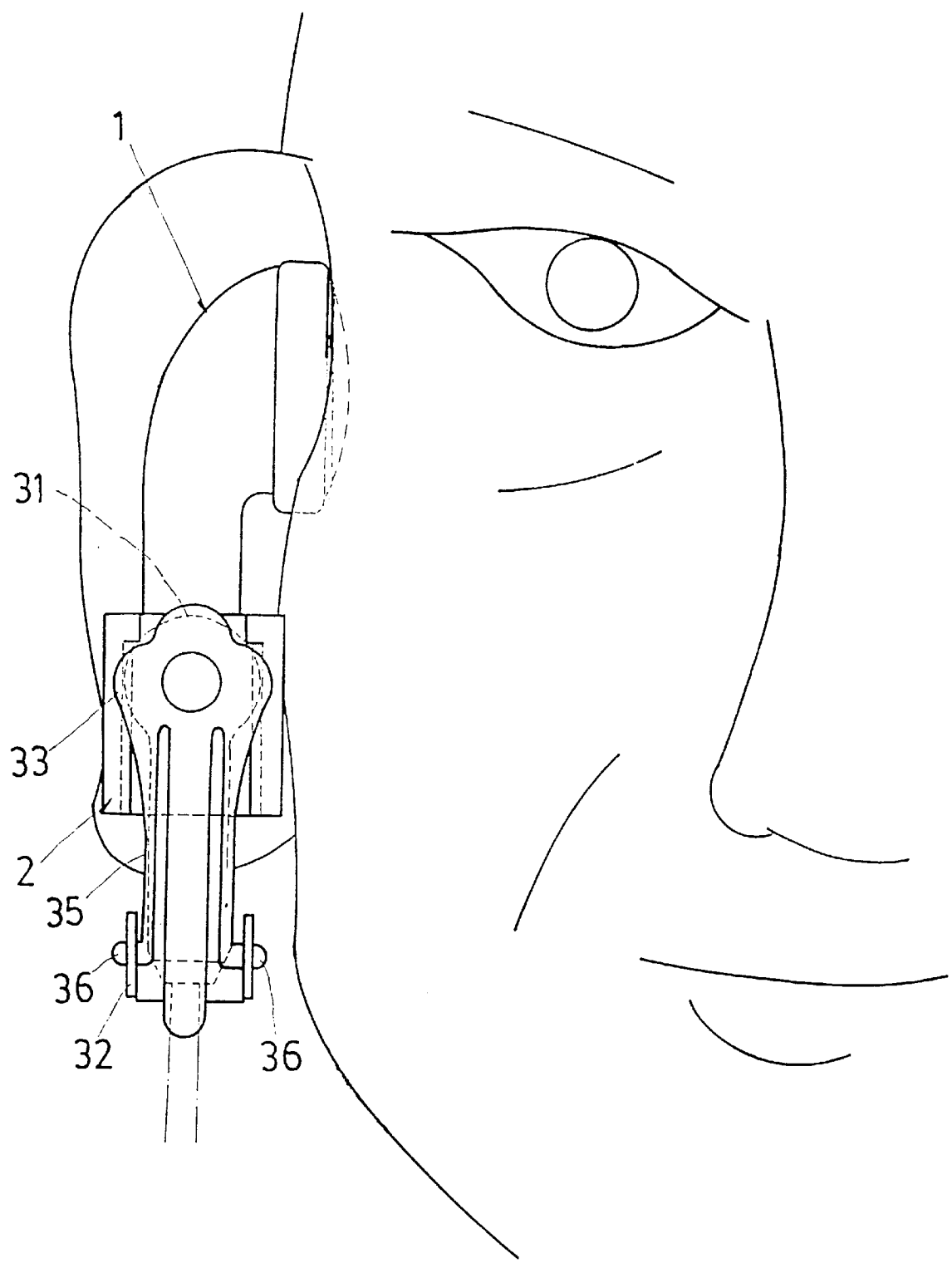
FIG. 4 is a schematic view showing the situation in use of the present invention.

Referring to FIG. 3 which is a schematic view showing action of the present invention. Wherein, the clamp 3 is formed by pivotal connecting of the pivot ends 36 on both sides of the extension leaves 35 with the pivot seat 32 on the bottom of the insertion engaging sheet 31, the spring leaf 34 renders the pressing sheet 33 to be clamped tight on the insertion engaging sheet 31.

When the pressing sheet 33 is pulled outwardly, it is provided with suitable restoring force primarily, while if it is pulled over its limit, the pressing sheet 33 will be maintained in an open state.

Such open state formed on the pressing sheet 33 and the insertion engaging sheet 31 can be used to have the clamp 3 clamped on a lower ear lobe, when the earpiece 1 on the connecting seat 2 is inserted into an ear, the pressing sheet 33 is pulled to render the pressing sheet 33 to clamp on the lower ear lobe, so that the earpiece 1 inserted into the ear can be positioned and fixed properly.

By the above stated structure, when a user wearing the earpiece 1 moves, the earpiece 1 will not drop by normal shaking or waving of the user's head, thus convenience as well as firmness of wearing of the earpiece 1 by the user can be achieved.

In veiw of the above statement, the clamp 3 of the present invention can be used to position and fix the common earpiece 1, and get rid of the problem of dropping by shaking or waving of the user's head, and provide convenience and practicality of use of the earpiece 1.

Having thus described the technical structure of my invention with practicability and novelty, therefore, what I claim as new and desire to be secured by Letters Patent of the United States is:

1. A structure of earpiece clamp comprising a connecting seat and a clamp and being characterized in that:

said connecting seat is provided with a front engaging groove defined by two front groove walls thereon, and a rear engaging groove defined by two rear groove walls thereon;

said clamp is comprised of an insertion engaging sheet and a pressing sheet, said insertion engaging sheet is provided on the bottom thereof with a pivot seat, said pressing sheet is provided at the middle thereof with a spring leaf, an extension leaf is provided at either side of said spring leaf, said two extension leaves are provided on the bottom thereof with pivot ends extending outwardly, said pivot ends on both sides of said extension leaves are pivotally connected with said pivot seat on the bottom of said insertion engaging sheet;

by the above stated structure, said front engaging groove of said connecting seat is used for inserting therein an earpiece, while said rear engaging groove of said connecting seat is used for inserting therein said insertion engaging sheet from below.

* * * * *